United States Patent [19]
Barber

[11] 3,844,942
[45] Oct. 29, 1974

[54] PROCESS FOR AIR POLLUTION ABATEMENT

[75] Inventor: Ernest C. Barber, Cherry Hill, N.J.

[73] Assignee: Texaco, Inc., New York, N.Y.

[22] Filed: Nov. 17, 1971

[21] Appl. No.: 199,777

[52] U.S. Cl.......................... 210/50, 210/61, 210/63
[51] Int. Cl.............................................. B01j 9/04
[58] Field of Search .......... 55/73; 166/310; 210/44, 210/47, 49, 50, 59, 61, 63, 219; 423/573, 577

[56] References Cited
UNITED STATES PATENTS

| | | | |
|---|---|---|---|
| 3,039,855 | 6/1962 | Urban | 423/573 |
| 3,186,942 | 6/1965 | Benger | 210/63 |
| 3,423,180 | 1/1969 | Hoekstra | 423/573 |
| 3,477,581 | 11/1969 | Stearns | 210/219 X |
| 3,536,618 | 10/1970 | Urban et al. | 210/50 |
| 3,536,619 | 10/1970 | Urban et al. | 210/50 |
| 3,576,738 | 4/1971 | Duffy | 210/44 |
| 3,618,667 | 11/1971 | Snavely, Jr. | 210/63 X |

OTHER PUBLICATIONS

"Journal of Petroleum Technology," Page 443, April 1971, E. S. Snavely.

Primary Examiner—Samih N. Zaharna
Assistant Examiner—Robert H. Spitzer
Attorney, Agent, or Firm—T. H. Whaley; C. G. Ries

[57] ABSTRACT

A process for air pollution control is provided wherein hydrogen sulfide dissolved in water produced from subterranean hydrocarbon reservoirs is reduced in concentration so that it will have little tendency to escape into the atmosphere as the water reaches atmospheric pressure. The process takes place in a plurality of reactors. Catalytic oxidation of dissolved hydrogen sulfide is effected in the first reactor which is covered. Unreacted hydrogen sulfide gas evolving from the water in the first reactor is essentially completely reacted in the subsequent reactors.

2 Claims, 2 Drawing Figures

PATENTED OCT 29 1974

3,844,942

PROCESS FOR AIR POLLUTION ABATEMENT

BACKGROUND OF THE INVENTION

1. Field of the Invention

This invention pertains to the field of air pollution abatement.

2. Discussion of the Prior Art

Hydrogen sulfide is a highly toxic gas with a powerful and offensive odor. Even in low concentrations the odor of hydrogen sulfide is a nuisance because of its offensive character. Hydrogen sulfide is often an acute problem in oil production operations. Often water is produced along with oil from underground hydrocarbon reservoirs. Certain reservoirs also contain hydrogen sulfide gas which is dissolved in large concentrations in the produced water. Water containing hydrogen sulfide in this way is referred to as sour water. As this water is produced with the oil, it is usually separated from the oil in the field and sent to large open ponds before further use is made of it. These ponds are at atmospheric pressure. As this produced water reaches the pond and atmospheric pressure the hydrogen sulfide becomes less soluble in water and begins to escape into the atmosphere. The result is pollution of the air by this offensive gas. Efforts to prevent hydrogen sulfide from escaping into the atmosphere have heretofore been inefficient, ineffective or too costly. Chlorination and precipitation are methods that have been attempted in an effort to remove hydrogen sulfide from water. However, hydrogen sulfide removal by chlorination is useful only where the water contains very little hydrogen sulfide. Where the amount of hydrogen sulfide gas becomes substantial, as in sour water, the cost of chlorine gas makes the process uneconomical. Precipitation methods are likewise prohibitively expensive.

E. S. Snavely and F. E. Blount, Corrosion, Volume 25, Page 397, 1969, describe a method of oxygen scavenging in water. With hydrogen sulfide using a transition metal catalyst. The process of this invention on the other hand is a method of pollution control in which hydrogen sulfide dissolved in water may be reacted with oxygen in the presence of a transition metal catalyst yielding elemental sulfur in solid form which may then be removed by conventional means.

U.S. Pat. No. 3,576,738 describes a process whereby sour water, air and a soluble nickel compound is subjected to pressure so that some of the air dissolves in the sour water. A reaction takes place between the dissolved oxygen in the air and the hydrogen sulfide. The mixture is then depressurized allowing the air and dissolved unreacted hydrogen sulfide to come out of solution and escape from the water. The method of this patent, however, has severe disadvantages which will limit its usefulness in the field of air pollution control. Increasing pressure is not an efficient way of increasing oxygen transfer into water. The amount of oxygen which can be dissolved will have direct bearing on the amount of hydrogen sulfide which will be reacted. Also, very large pressure vessels and expensive pressurizing equipment will be needed to operate under the method of the patent. The method of the patent will inherently provide a fairly high level of hydrogen sulfide as off gas because of its mode of operation. Since the process of the patent uses an ineffective method of dissolving oxygen with water some hydrogen sulfide will remain unreacted. As the dissolved oxygen and inert gases mixed with it come out of solution and bubble through the water the unreacted hydrogen sulfide will be stripped into the air above water. The patent provides no technique for disposing of this escaped hydrogen sulfide. The process of my invention solves these problems by providing for intimate mixing of oxygen and sour water which will increase the probability that enough oxygen will dissolve in the water to completely react with the hydrogen sulfide dissolved in the water. Further, my invention provides for a reactor having at least two stages wherein any hydrogen sulfide left unreacted in the first stage and stripped from the water into the gas above the water will be introduced into second and subsequent stages wherein it will be essentially completely reacted and removed, so that no hydrogen sulfide will be stripped into the atmosphere from the second stage. Also, the method of my invention operates at atmospheric pressure. Air containing oxygen is pumped through a plurality of openings in the bottom of the reactor. The air is dissolved in the water by mixers located in the reactor beneath the water. The mixers used in my process may be operated by the action of the air bubbling through them or may be motor driven. The use of mixers effectively increases the rate of oxygen absorption into the water by breaking the air into very fine bubbles to maximize the air water interfacial area. The greater this interfacial area the greater the rate of absorption of oxygen into the water. Mixers also agitate the water. Without agitation the water interface will reach equilibrium very rapidly and the rate of absorption will become diffusion dependent. But if agitation occurs as in my invention fresh interfaces are constantly being exposed and, therefore, absorption is not limited by the rate of diffusion. Also, the method of the patent is limited to nickel catalyst. However, my invention will operate satisfactorily with all transition metal catalysts which are soluble in water.

It is, therefore, an object of this invention to provide a method of removing hydrogen sulfide gas from sour water which is efficient and low in cost. It is a further object of this invention to reduce the concentration of hydrogen sulfide in sour water, thereby, reducing the tendency of hydrogen sulfide to evolve from the water.

SUMMARY OF THE INVENTION

Figure 1:
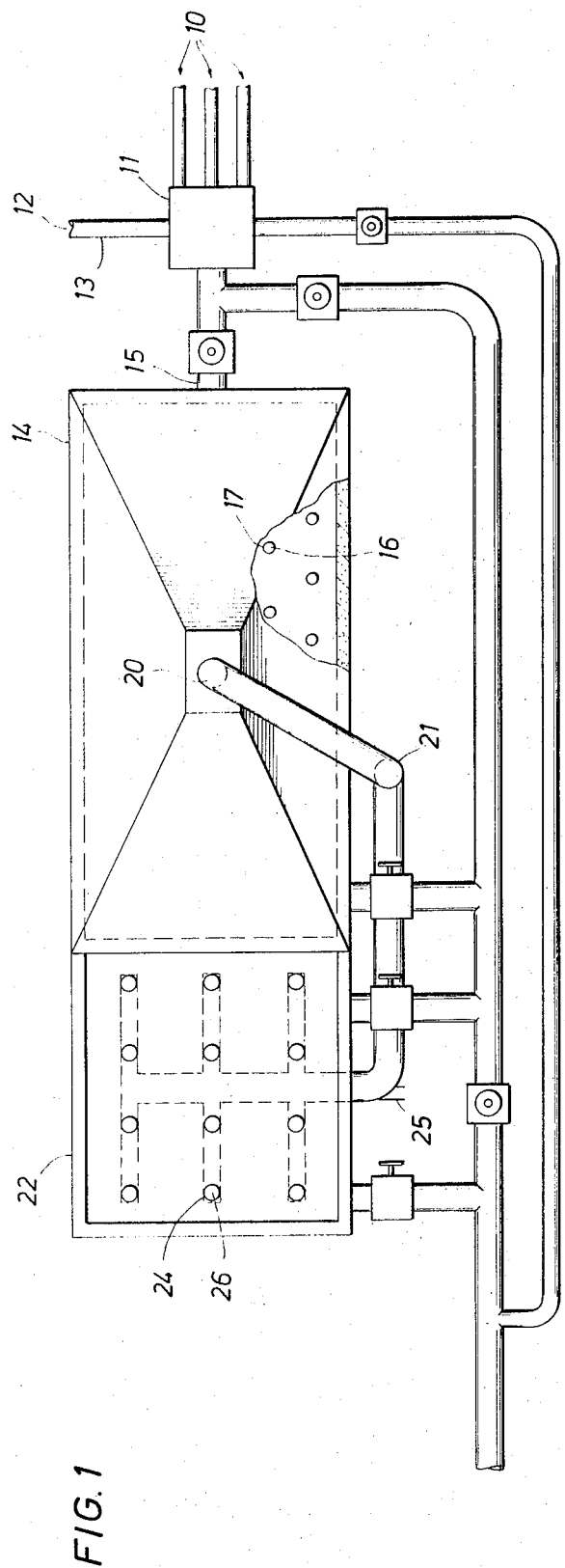
FIG. 1 depicts a typical process within the scope of my invention.

A process for air pollution control is provided wherein hydrogen sulfide dissolved in water produced from subterranean hydrocarbon reservoirs is reduced in concentration so that it will have little tendency to escape into the atmosphere as the water reaches atmospheric pressure. The process involves providing a plurality of reactors connected in series. The first reactor in each set is a container which shall hold water and is covered to prevent gas leakage to the atmosphere. Subsequent reactors in each set are containers much like the first one except that the last one need not be covered. Hydrogen sulfide ladened water mixed with a suitable oxidation catalyst is introduced into the first reactor which is at atmospheric pressure. Oxygen is dissolved in the water by agitation so that the hydrogen sulfide and oxygen will react. The unreacted hydrogen sulfide gas which evolves from the water in the first reactor is introduced into the second reactor containing water, dissolved catalyst and dissolved oxygen. This hydrogen sulfide is dissolved into the water in the second reactor. Any unreacted hydrogen sulfide from the second reactor is collected and introduced into a subsequent reactor and so on until the hydrogen sulfide is virtually all reacted.

DESCRIPTION OF THE PREFERRED EMBODIMENTS

My invention is applicable to the treatment of hydrogen sulfide ladened water which is produced from subterranean hydrocarbon reservoirs along with oil. As the water and oil come to the surface they are separated in treatment facilities located in the oil field. The water often contains considerable amount of dissolved hydrogen sulfide which is not removed in these facilities. The hydrogen sulfide ladened water is then pumped or gravity fed to the reactors of my invention. Only the pressure necessary to move the water need be used to introduce the water into the reactors. To prevent hydrogen sulfide contamination of the air it is necessary that the water be kept in covered conduits and containers until it reaches the reactors of my invention.

As the water reaches the reactors a catalyst which is soluble in the water and useful for oxidation purposes is introduced and dissolved in the water. Preferred catalysts are transistion metal salts. Within this class the preferred catalysts are nickel chloride and cobalt chloride. The amount of catalyst is not critical as long as there is sufficient catalyst to promote the reaction between oxygen and hydrogen sulfide. Amounts as low as 0.001 parts per million (ppm) of catalyst based on the sour water are usually sufficient to catalyze the reaction between hydrogen sulfide and oxygen. Amounts up to the limit of solubility of the catalyst in the water may be used, but not much improvement in the reaction is realized above 2.0 ppm. It is preferred to use from about 0.1 to about 2 ppm of catalyst.

The reactor to be used in my invention may be of varying types but it is required that it be in at least two stages. Generally, the reactor should be in the form of a container which will hold water in sufficient amounts to continuously treat water produced from a particular oil field or section of an oil field. Each stage of the reactor except the last is required to have a cover to prevent the escape of hydrogen sulfide into the atmosphere. Sour water from production wells is introduced into this first stage at atmospheric pressure and the reactor is operated at atmospheric pressure during the course of treatment of the sour water. The reactor may be constructed of any material which is unreactive with hydrogen sulfide or salt water. The second and any subsequent stages of the reactor are also in the form of a container to hold water. However, the last is not required to be covered since by this time essentially all of the hydrogen sulfide should be reacted and there will no longer be significant amounts of hydrogen sulfide evolving into the air. The oxygen to be used to react with the hydrogen sulfide may be pure or contain an otherwise inert gas. Air for example, would be a suitable source of oxygen. The oxygen should be present in such concentrations so that there is an amount in excess of that needed to convert hydrogen sulfide to elemental sulfur. This is true in each stage of the reactor. The amount of oxygen needed will be determined by balancing the amount of oxygen that can be effectively used in the reaction and the amount of stripping of hydrogen sulfide which takes place. The stripping should be kept at a minimum while trying to react as much hydrogen sulfide as possible. In each stage the amount of oxygen should be such that essentially all of the hydrogen sulfide should theoretically be reacted to reduce the number of stages needed. Of course, some hydrogen sulfide may escape since absorption of hydrogen sulfide and oxygen may not be complete and, therefore, all of it may not react. The amount of hydrogen sulfide finally allowed to escape, if any, should be so small that it will be dissipated within a few hundred feet of the reactor so that no odor problem in the surrounding area will result.

In each stage a maximum amount of oxygen and hydrogen sulfide should be dissolved to insure more complete reaction. In order to accomplish this the oxygen is introduced into the bottom of the first stage reactor where it is mixed intimately with the hydrogen sulfide ladened water by mixers. Sufficient mixers should be provided so that the amount of oxygen in excess of that stoichiometrically necessary to react with hydrogen sulfide will be dissolved in the hydrogen sulfide ladened water. The same type of mixers are to be used in the subsequent stages where the hydrogen sulfide and oxygen which escaped from the water in the previous stage will be taken and pumped into the bottom of the next stage. It is essential to the proper operation of my invention that this surprising step be taken. After the water in the first stage is essentially rendered free of hydrogen sulfide by either reaction with oxygen or stripping, the gas above the water in the first stage which may be ladened with hydrogen sulfide is reinjected into water in the second stage which contains dissolved catalyst and, if needed, additional oxygen. If necessary any hydrogen sulfide collecting above the water in the second stage is collected and reinjected into the bottom of a third stage and so on until the hydrogen sulfide is essentially completely reacted. This reinjection of hydrogen sulfide in water in the subsequent stages provides a medium for the completion of the reaction of hydrogen sulfide and provides a use for the water from the previous stages. It is important and essential to the operation of my invention that the mixing procedure be sufficient to dissolve an ample amount of oxygen into the hydrogen sulfide ladened water so that the reaction is completed in as few stages as possible.

The water used in my invention is produced from subterranean hydrocarbon reservoirs and contains dissolved hydrogen sulfide. The pH of the water should be below 7 to prevent formation of insoluble sulfide salts with the metal ion of the catalyst used. These insoluble salts will not form in an acid medium as they are soluble therein. The soluble transition metal ion, therefore, will remain soluble in an acidic medium and will be homogeneously dispersed throughout the water providing for efficient catalytic activity. The sulfur product of the reaction between oxygen and hydrogen sulfide may be removed by conventional means known to those skilled in the art.

Figure 2:
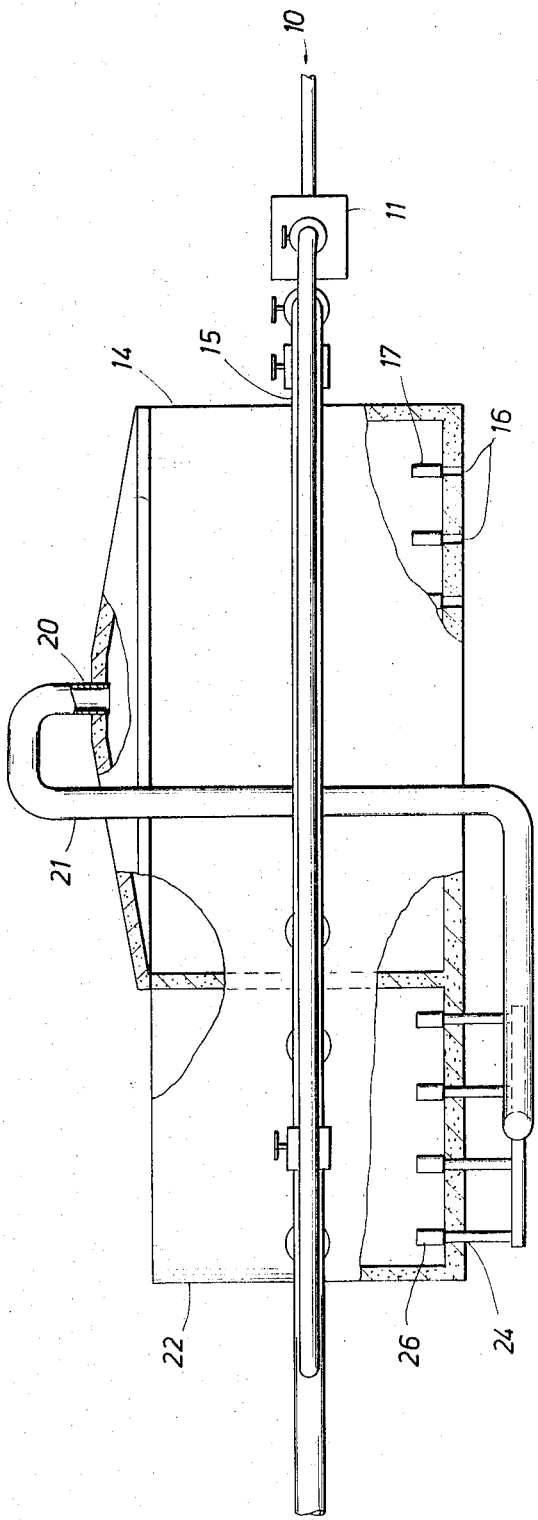

The process of my invention may be more easily understood by referring to the following figures which illustrate an example of a process within the scope of my invention. FIG. 1 is a planned view of the process wherein hydrogen sulfide ladened water is reacted with oxygen to remove the hydrogen sulfide from the water and reduce it to elemental sulfur so that it will not contaminate the atmosphere. Sour water 10 ladened with hydrogen sulfide gas is gathered at a collecting point 11 where catalyst 12 is introduced through a line 13. The sour water with dissolved catalyst enters a covered water tight container 14 through line 15. Oxygen is introduced into the container 14 through a plurality of openings 16 in the bottom of the container. A portion of these openings are shown in the cutaway view. A portion of the oxygen is dissolved in the water by static mixers 17 attached to the bottom of the covered container and shown in side view in FIG. 2. The dissolved oxygen reacts with the hydrogen sulfide in the water to form elemental sulfur and water. Undissolved oxygen bubbles through the water stripping any unreacted hydrogen sulfide from solution. The mixture of unreacted oxygen and hydrogen sulfide bubble through the water and collect above the water level in the covered container. This mixture of gases is gathered by a collection device 20 and transported by a line 21 to the bottom of the second container 22 which is uncovered and contains water and dissolved catalyst. The mixture of gases enters the second container through openings 24 in the bottom of the second container. Water and dissolved catalyst in the second container may come from the first container provided it is taken from the opposite end of the introduction of the initial sour water into the first container, so that there is little or no hydrogen sulfide gas dissolved in the water in the second container. If required, a line 25 simultaneously brings additional oxygen to the second container sufficient to completely react with the incoming hydrogen sulfide. Static mixers 26, as in the first container, dissolve the oxygen and hydrogen sulfide in the water and catalyst mixture. The uncontaminated water leaving the second container may be disposed of or reused in any way. The gas emerging from the water above the second container will be essentially free of hydrogen sulfide.

I claim:

1. A process for catalytically removing hydrogen sulfide contained in water produced from a subterranean hydrocarbon reservoir comprising
   a. dissolving a catalytic amount of a soluble transition metal salt in the hydrogen sulfide ladened water,
   b. introducing the hydrogen sulfide ladened water and catalyst into a covered container which is gas tight and is at atmospheric pressure,
   c. introducing an amount of oxygen into the water in the container which is at least stoichiometric with the amount of hydrogen sulfide dissolved in the water,
   d. dissolving the oxygen in the water by mixing to effect a reaction between the oxygen and hydrogen sulfide,
   e. collecting any hydrogen sulfide which evolves from the water in the container,
   f. dissolving this collected hydrogen sulfide into water from said covered container containing dissolved catalyst in a second container,
   g. dissolving sufficient additional oxygen into the water in the second container to at least stoichiometrically convert all the said collected hydrogen sulfide to elemental sulfur, and
   h. repeating steps *e* through *g* in additional containers, as needed, until essentially all of the hydrogen sulfide is reacted.

2. The process of claim 1 wherein the transition metal salt is nickel chloride or cobalt chloride present in an amount from about 0.1 ppm to 2.0 ppm and the oxygen is obtained from air.

* * * * *